(12) United States Patent
Park

(10) Patent No.: US 12,084,020 B2
(45) Date of Patent: Sep. 10, 2024

(54) BRAKE APPARATUS AND INSTALLATION METHOD THEREOF

(71) Applicant: HYUNDAI MOBIS CO., LTD., Seoul (KR)

(72) Inventor: Si Yoon Park, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/752,386

(22) Filed: May 24, 2022

(65) Prior Publication Data

US 2022/0402472 A1 Dec. 22, 2022

(30) Foreign Application Priority Data

Jun. 16, 2021 (KR) .......................... 10-2021-0078197
Apr. 21, 2022 (KR) .......................... 10-2022-0049700

(51) Int. Cl.
*B60T 17/08* (2006.01)

(52) U.S. Cl.
CPC .................................. *B60T 17/088* (2013.01)

(58) Field of Classification Search
CPC ............................. B60T 17/088; B60T 11/16
USPC ......................................................... 188/152
See application file for complete search history.

(56) References Cited

U.S. PATENT DOCUMENTS

| | | | | |
|---|---|---|---|---|
| 3,248,883 A * | 5/1966 | Bowlsby | ............... | B60T 11/203 60/567 |
| 4,640,478 A * | 2/1987 | Leigh-Monstevens | ...................... | F16D 25/12 248/27.1 |
| 4,658,660 A * | 4/1987 | Parker | ................... | B60T 13/567 248/222.51 |
| 4,798,129 A * | 1/1989 | Staub, Jr. | ................ | F01B 11/02 248/222.13 |
| 6,000,516 A * | 12/1999 | Teichert | .................. | B60T 11/16 192/115 |
| 6,322,284 B1 * | 11/2001 | Bonardo | ................. | F16D 25/08 285/376 |
| 6,668,997 B2 * | 12/2003 | Sander | .................. | F16D 25/088 192/85.48 |
| 2021/0053536 A1 * | 2/2021 | Ichiyanagi | ............ | B60T 13/161 |
| 2022/0402472 A1 * | 12/2022 | Park | ........................ | B60T 11/16 |

FOREIGN PATENT DOCUMENTS

| | | | | |
|---|---|---|---|---|
| DE | 102007007216 A1 * | 12/2007 | ............. | B62D 21/15 |
| DE | 102009040036 A1 * | 4/2010 | ............. | B60T 11/16 |
| GB | 2382389 A * | 5/2003 | ............. | B60T 17/088 |

* cited by examiner

*Primary Examiner* — Thomas J Williams
(74) *Attorney, Agent, or Firm* — NovoTechIP International PLLC

(57) ABSTRACT

According to at least one aspect, the present disclosure provides a brake apparatus comprising: a cylinder body; a fixing part comprising one or more screw fastening holes so as to be coupled to the cylinder body; and a mounting part installed at the cylinder body or the fixing part so that the cylinder body is mounted to the fixing part.

According to another aspect, the present disclosure provides a brake apparatus comprising: a cylinder body; a bracket formed on one side of the cylinder body; a fixing part comprising one or more screw fastening holes so as to be coupled to the bracket; and a mounting part formed in the cylinder body or the bracket so that the cylinder body is mounted to the fixing part.

11 Claims, 8 Drawing Sheets

BRAKE APPARATUS AND INSTALLATION METHOD THEREOF

CROSS-REFERENCE TO RELATED APPLICATION

The present application claims priority to and the benefit of Korean Patent Applications No. 10-2021-0078197, filed on Jun. 16, 2021, and No. 10-2022-0049700, filed on Apr. 21, 2022, the disclosure of which is incorporated herein by reference in their entirety.

TECHNICAL FIELD

The present disclosure relates to a brake apparatus and an installation method thereof.

BACKGROUND

The statements in this section merely provide background information related to the present disclosure and may not constitute a related art.

Various apparatuses are included in a vehicular brake system. In particular, when it comes to a brake pedal apparatus, a brake pedal to transmit a pedal effort input and a cylinder body are installed at a partition disposed between a cabin room and an engine room of a vehicle.

In a method of installing the brake pedal and the cylinder body, two or more operators set the positions of the brake pedal and the cylinder body in the engine room and the cabin room, respectively, and then fasten screws to install the cylinder body and the like in the partition of the vehicle. In another method, one operator repeatedly goes to the engine room and the cabin room to set the position of the cylinder body and the like and install the same in the partition. However, each of these methods has a problem of a waste of human resources or inefficient work.

Accordingly, in order to efficiently install brake parts, it is necessary to mount the brake parts before installing the same in the partition of the vehicle.

Currently, stud bolts are used to mount brake parts. However, in order to mount the brake parts on the partition of the vehicle using the stud bolts, the stud bolts must sufficiently support the weight of each part, and thus, each stud bolt has an excessively long length. The excessively long stud bolts take up much space in the small engine room. An engine room of a next-generation eco-friendly vehicle tends to be very small, so securing space in the engine room is emerging as an important issue.

SUMMARY

According to at least one aspect, the present disclosure provides a brake apparatus comprising: a cylinder body; a fixing part comprising one or more screw fastening holes so as to be coupled to the cylinder body; and a mounting part installed at the cylinder body or the fixing part so that the cylinder body is mounted to the fixing part.

According to another aspect, the present disclosure provides a brake apparatus comprising: a cylinder body; a bracket formed on one side of the cylinder body; a fixing part comprising one or more screw fastening holes so as to be coupled to the bracket; and a mounting part formed in the cylinder body or the bracket so that the cylinder body is mounted to the fixing part.

DETAILED DESCRIPTION

Figure 1:
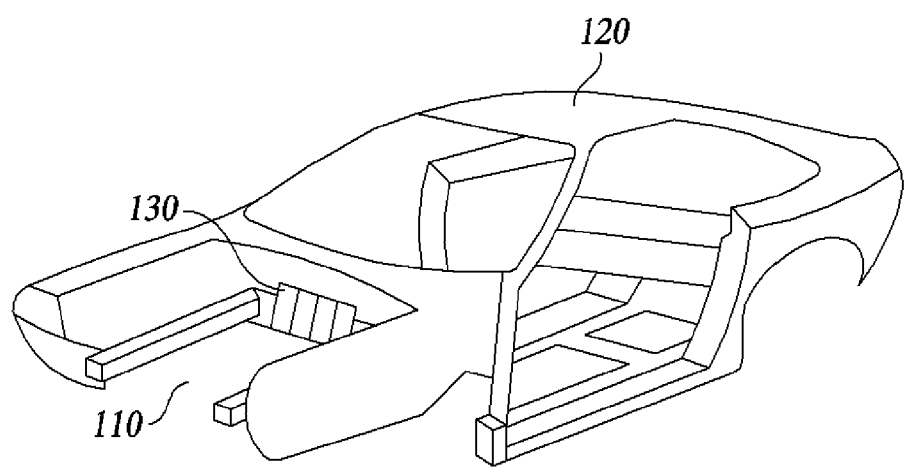
FIG. 1 is a perspective view illustrating an engine room, a cabin room, and a partition of a vehicle in which a brake apparatus according to an embodiment of the present disclosure is installed.

The present disclosure provides a brake apparatus including a mounting part to mount a cylinder body to a fixing part such as a partition of a vehicle, thereby providing an advantage in terms of space in a small engine room.

The present disclosure provides a brake apparatus including a mounting part to mount a cylinder body to a fixing part, such as a partition, of a vehicle, so that an operator can efficiently work on an assembly line.

Objects of the present disclosure are not limited to the above objects, and other objects which are not described herein will become apparent to those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

FIG. 1 is a perspective view illustrating an engine room, a cabin room, and a partition of a vehicle in which a brake apparatus according to an embodiment of the present disclosure is installed.

Figure 2:
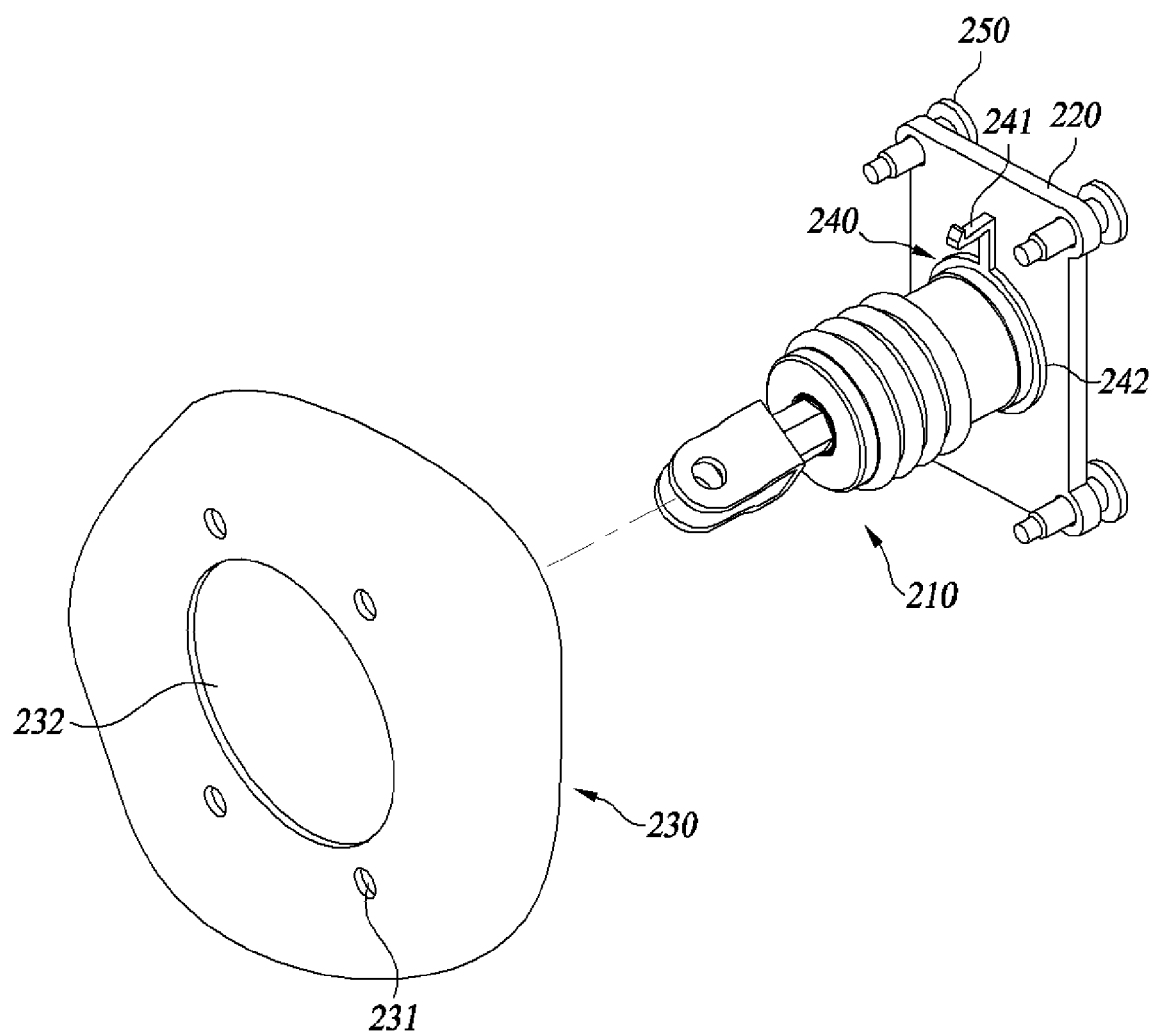
FIG. 2 is an exploded perspective view of a brake apparatus according to an embodiment of the present disclosure.

FIG. 2 is an exploded perspective view of a brake apparatus according to an embodiment of the present disclosure.

Figure 3:
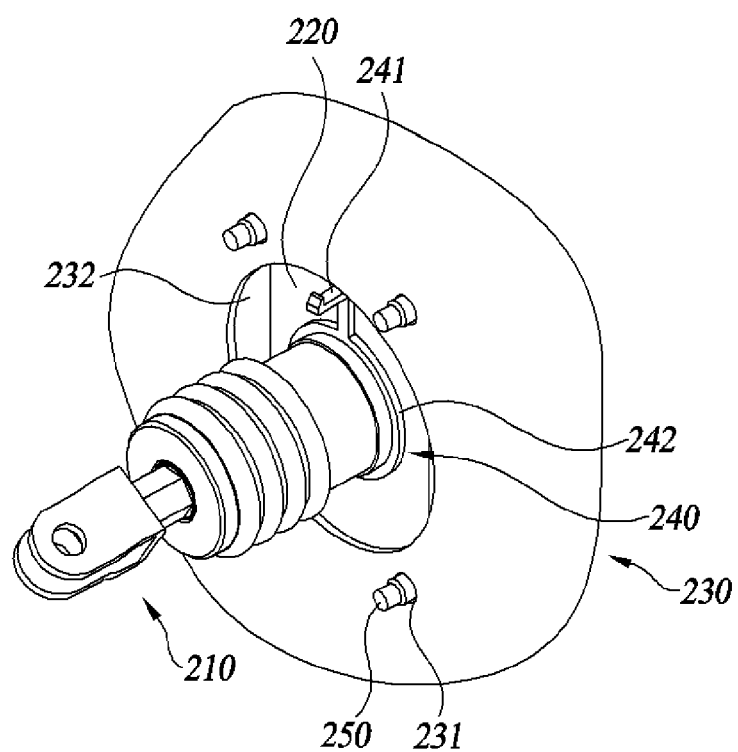
FIG. 3 is a perspective view of a brake apparatus according to an embodiment of the present disclosure.

FIG. 3 is a perspective view of a brake apparatus according to an embodiment of the present disclosure.

Figure 4:
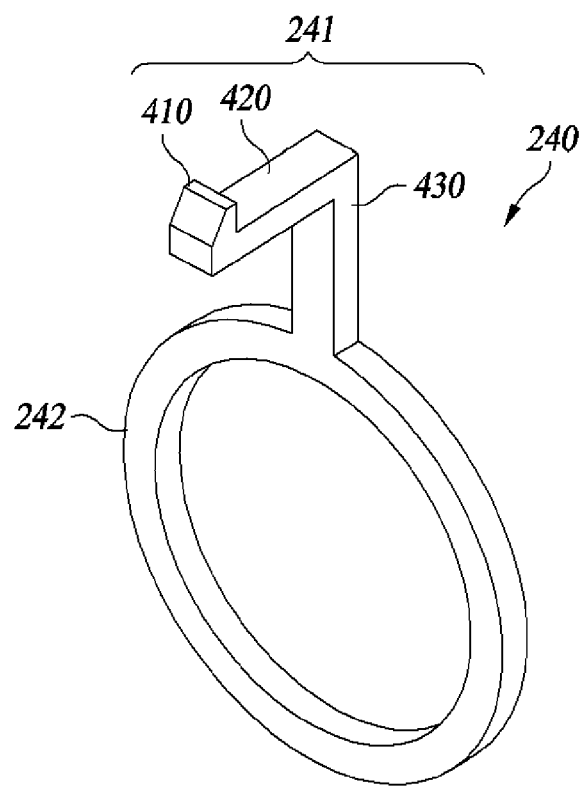
FIG. 4 is a perspective view of a mounting part according to an embodiment of the present disclosure.

FIG. 4 is a perspective view of a mounting part according to an embodiment of the present disclosure.

Referring to FIGS. 1 to 4, a vehicle may include an engine room 110, a cabin room 120, and a partition 130. As will be described later, a cylinder body 210 formed to transmit a pedal effort input may be installed at the partition 130 of the vehicle through the engine room 110 and the cabin room 120.

The brake apparatus according to an embodiment of the present disclosure may include the cylinder body 210, a bracket 220, a fixing part 230, and a mounting part 240.

The cylinder body 210 may be coupled to a brake pedal along a longitudinal direction of the cylinder body 210, and the bracket 220 may be formed on one side of the cylinder body 210 to be coupled to the partition 130 of the vehicle.

The fixing part 230 may include a screw fastening hole 231 and an insertion hole 232.

The mounting part 240 according to an embodiment of the present disclosure may include a hook member 241 and a ring member 242.

The hook member 241 may include an engaging portion 410, a first support portion 420, and a second support portion 430.

The cylinder body 210 is a member to transmit a pedal effort input using a brake pedal. The cylinder body 210 may be coupled to the brake pedal connected to the cabin room 120 of the vehicle along the longitudinal direction of the cylinder body 210. The mounting part 240 may be installed in at least a portion of the cylinder body 210.

Meanwhile, the bracket 220 may be formed on one side of the cylinder body 210 so that the cylinder body 210 can be installed at the partition 130 of the vehicle. The bracket 220 may be integrally formed with the cylinder body 210. The bracket 220 is preferably formed in a size smaller than a size of the insertion hole 232 of the fixing part 230 so that the cylinder body 210 can be installed at the fixing part 230. At least a portion of the bracket 220 may have a hole into which a screw is inserted, so that the bracket 220 can be coupled to the fixing part 230. The bracket 220 may be mounted and/or fixed to the fixing part 230 together with the cylinder body 210. However, the bracket 220 is not necessarily used to mount and/or fix the cylinder body 210 to the fixing part 230, and other methods such as direct coupling of the cylinder body 210 to the fixing part 230 may be used depending upon the purpose and use.

The fixing part 230 is configured to mount and/or fix the cylinder body 210 and/or the bracket 220. Here, the fixing part 230 may be the partition 130 of the vehicle. The fixing part 230 may be coupled to the bracket 220. The fixing part 230 may include one or more screw fastening holes 231 so as to be screwed to the bracket 220. The fixing part 230 may include the insertion hole 232 into which at least a portion of the cylinder body 210 is inserted.

The fixing part 230 may be formed in a rectangular shape to be firmly coupled to the cylinder body 210 and/or the bracket 220. In a case where the fixing part 230 is formed in a polygonal shape such as a square, a screw fastening hole 231 may be formed at each corner of the fixing part 230 to achieve stable coupling to the cylinder body 210 and/or the bracket 220. However, the shape of the fixing part 230 is not necessarily limited thereto, and the fixing part 230 may be formed in a different shape depending on the purpose and use.

The mounting part 240 is a member that allows the cylinder body 210 to be mounted to the fixing part 230 before the cylinder body 210 is fixed or coupled to the fixing part 230. According to an embodiment of the present disclosure, the mounting part 240 may be formed in a hook structure for mounting of the cylinder body 210.

As the cylinder body 210 is mounted to the fixing part 230 using the hook structure, the stud bolt 250 required to mount the cylinder body 210 in a process of installing the brake apparatus may have a short length. As the length of the stud bolt 250 is short, it is possible to address the difficulty of securing a space in the small engine room 110 and an operator may carry out an installation work efficiently and safely. However, the structure of the mounting part 240 is not necessarily limited to the hook structure, and the mounting part 240 may have a different structure depending on the purpose and use.

Referring back to FIG. 4, the mounting part 240 may include the hook member 241 and the ring member 242, and the hook member 241 may include the engaging portion 410, the first support portion 420, and the second support portion 430.

The engaging portion 410 may be formed in a hook structure as mentioned above, and the mounting part 240 is preferably formed to have an angle of 90° or less relative to the first support portion 420 so that the cylinder body 210 is firmly mounted to the fixing part 230. However, the present disclosure is not necessarily limited thereto, and the mounting part 240 may be formed to have an obtuse angle greater than 90° depending on the purpose and use.

The first support portion 420 is formed at one end of the engaging portion 410, and may be formed in a direction vertical to the second support portion 430. The first support portion 420 is preferably formed to a length that is identical to a thickness of the fixing part 230. In addition, the first support portion 420 may be formed to be shorter than a length of a stud bolt 250 that is generally used to mount brake parts. However, the shape and size of the first support portion 420 are not necessarily limited thereto, and the first support portion 420 may have various shapes and sizes depending on the purpose and use.

The second support portion 430 may be formed in a direction vertical to the first support portion 420 and may be connected to the ring member 242 that is formed to allow the mounting part 240 to be installed at the cylinder body 210. The second support portion 430 preferably has a length smaller than a value obtained by subtracting a radius of the insertion hole 232 formed in the fixing part 230 from a radius of the cylinder body 210, but the present disclosure is not necessarily limited thereto.

The ring member 242 is formed at one end of the second support portion 430. The ring member 242 may be formed in a circular shape. By inserting the cylinder body 210 into the ring member 242 of the mounting part 240, the mounting part 240 may be installed at the cylinder body 210. However, the mounting part 240 is not necessarily installed at the cylinder body 210, and the mounting part 240 may be installed at the cylinder body 210, the bracket 220, or the fixing part 230 in other ways depending on the purpose and use.

The mounting part 240 may be formed of a heat-resistant material capable of withstanding high temperatures in the engine room 110. Since the mounting part 240 is formed of a heat-resistant material, the mounting part 240 may be capable of stably supporting the cylinder body 210 without deforming in shape in the high-temperature engine room 110.

The mounting part 240 may be formed of a material such as plastic, which is a material capable of absorbing sound to prevent noise caused by collision and friction between parts. It is possible to suppress noise caused by friction and the like in a process of coupling to the cylinder body 210 and the fixing part 230 or in a process in which parts are coupled and operated.

The mounting part 240 may be formed of a material such as rubber, which is a material capable of absorbing mechanical stress by coupling between parts. Since the mounting part 240 is formed of a material capable of absorbing mechanical stress, it is possible to stably support the cylinder body 210 despite the mechanical stress caused by load acting between the parts.

The mounting part 240 may be formed as an elastic member so that the cylinder body 210 can be easily mounted to the fixing part 230. Using an elastic force of the elastic member, an operator may be able to easily mount the cylinder body 210 to the fixing part 230 on an assembly line.

However, a material of the mounting part 240 is not necessarily limited to the aforementioned material, and the mounting part 240 may be formed of a different material depending on the purpose and use.

Figure 5:
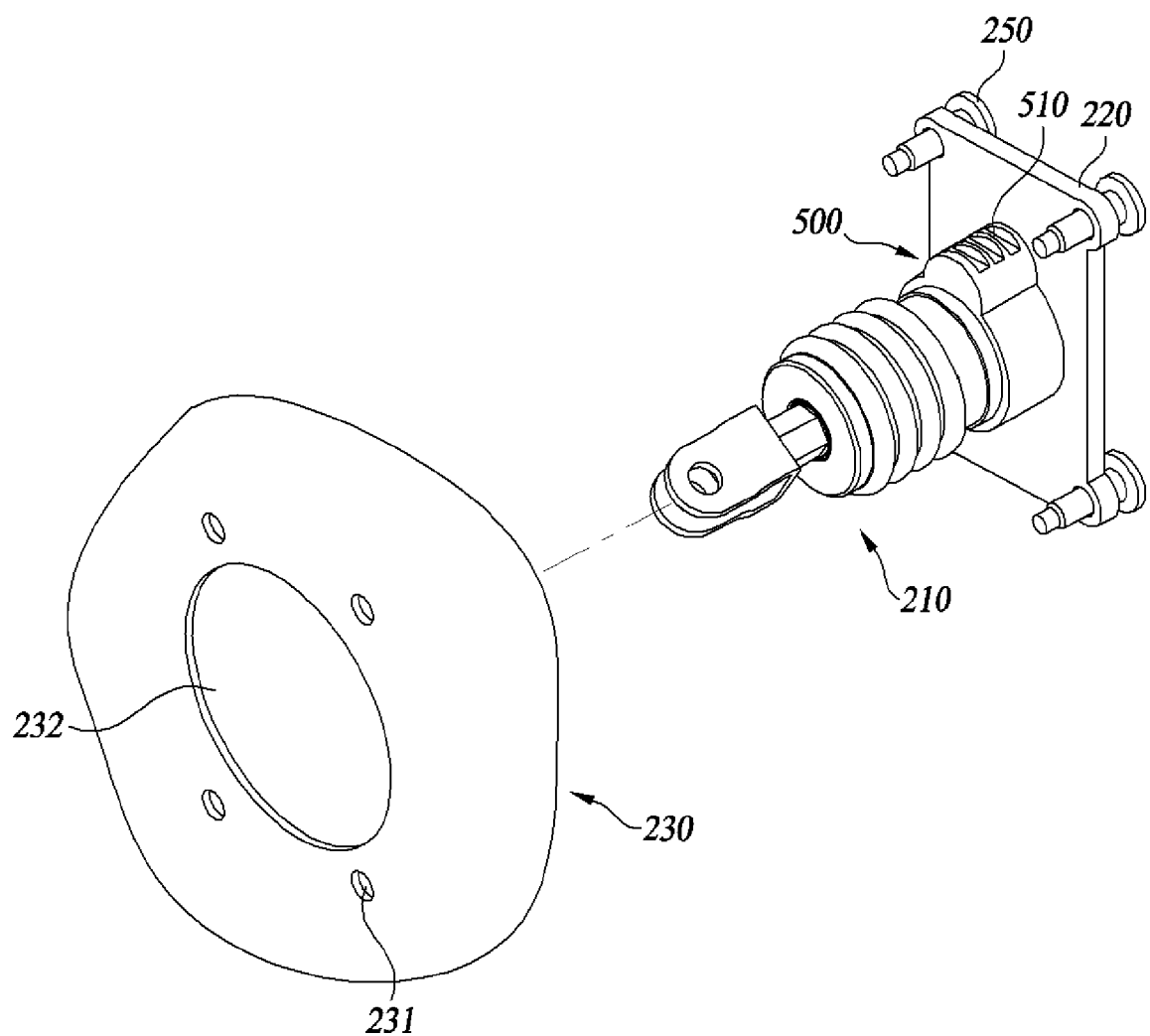
FIG. 5 is an exploded perspective view of a brake apparatus according to another embodiment of the present disclosure.

FIG. 5 is an exploded perspective view of a brake apparatus according to another embodiment of the present disclosure.

Figure 6:
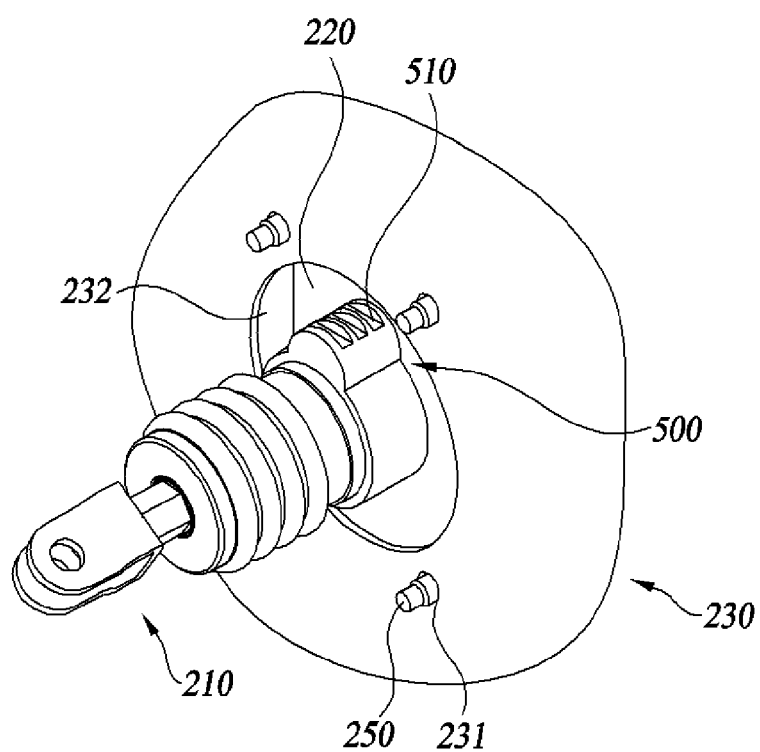
FIG. 6 is a perspective view of a brake apparatus according to another embodiment of the present disclosure.

FIG. 6 is a perspective view of a brake apparatus according to another embodiment of the present disclosure.

Figure 7:
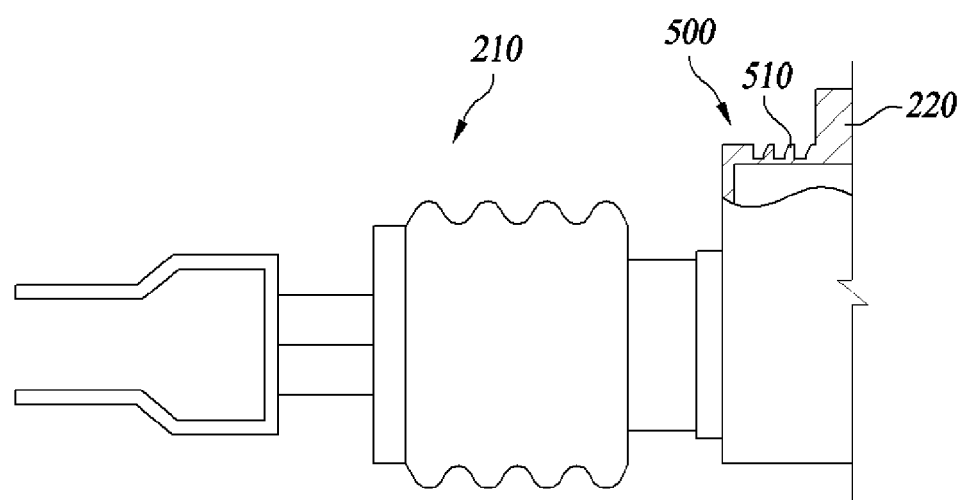
FIG. 7 is a cross-sectional view of a brake apparatus according to another embodiment of the present disclosure.

FIG. 7 is a cross-sectional view of a brake apparatus according to another embodiment of the present disclosure.

Another embodiment of the present disclosure is different from the above-described embodiment in terms of a structure of a mounting part and the like. Hereinafter, redundant descriptions will be omitted and only the difference will be described in detail. However, it should be noted that the features of each configuration in one embodiment may be equally or similarly applied to another embodiment as long as they are not contradictory to the other embodiment.

Referring to FIGS. 5 to 7, a brake apparatus according to another embodiment of the present disclosure may include a mounting part 500, and the mounting part 500 may include one or more stopping portions 510.

The mounting part 500 may be formed in at least one of a cylinder body 210 and a bracket 220 according to another embodiment of the present disclosure. In a case where a plurality of stopping portions 510 is formed in at least one of the cylinder body 210 and the bracket 220, an angle at which the cylinder body 210 and/or the bracket 220 is mounted to the fixing part 230 may be adjusted.

The mounting part 500 may be formed in the cylinder body 210 and/or the bracket 220 so that the cylinder body 210 and/or the bracket 220 can be mounted to the fixing part 230. The mounting part 500 may be formed in at least a portion of the cylinder body 210. The mounting part 500 may be formed in at least a portion of the bracket 220.

The mounting part 500 may include a stopping portion 510 to engage or be caught by at least a portion of the fixing part 230. The stopping portion 510 may be provided in plural. As shown in FIGS. 5 to 7, the plurality of stopping portions 510 may be formed in the cylinder body 210 and/or the bracket 220 along a longitudinal direction of the cylinder body 210. Since the plurality of stopping portions 510 is formed along the longitudinal direction of the cylinder body 210, an angle at which the cylinder body 210 is mounted to the fixing part 230 may be adjusted, and the cylinder body 210 may be easily mounted to the fixing part 230 regardless of the size of the cylinder body 210 and an insertion hole 232.

Figure 8:
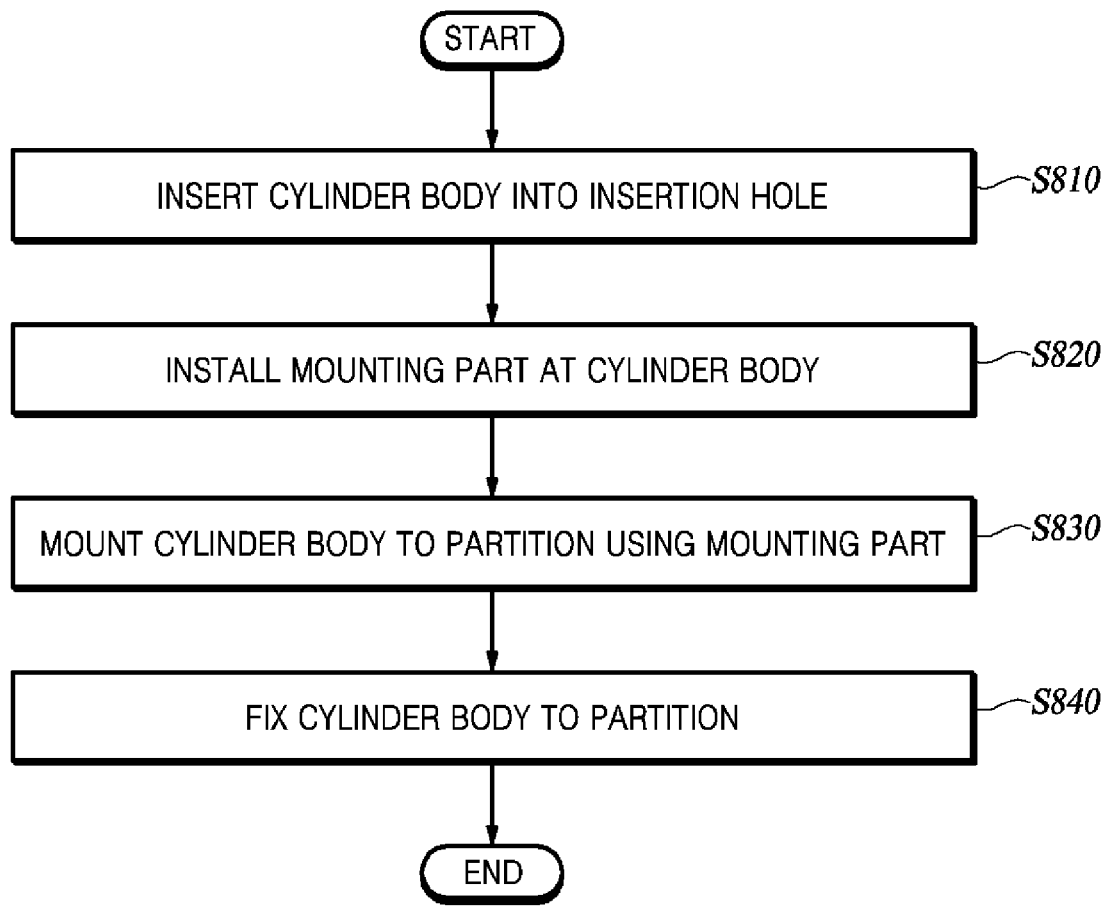
FIG. 8 is a flowchart illustrating an installation method of a brake apparatus according to an embodiment of the present disclosure.

FIG. 8 is a flowchart illustrating an installation method of a brake apparatus according to an embodiment of the present disclosure.

An operator inserts a cylinder body into an insertion hole formed in a fixing part such as a partition of a vehicle in operation S810. The operator may insert a cylinder body 210 into an insertion hole 232 to install the cylinder body 210 to a fixing part 230 such as a partition 130 of a vehicle.

The operator installs a mounting part at the cylinder body in operation S820. In a case where a mounting part 240 (see FIG. 2) according to an embodiment of the present disclosure is used to mount the cylinder body 210 to the partition 130 of the vehicle, the operator may install the mounting part 240 to the cylinder body 210. The operator may install the mounting part 240 to the cylinder body 210 by using a ring member 242 of the mounting part 240. On the other hand, in a case where a mounting part 500 (see FIG. 5) according to another embodiment of the present disclosure is used to mount the cylinder body 210, a process of installing the mounting part 500 to the cylinder body 210 may be omitted.

The operator mounts the cylinder body to the partition using the mounting part in operation S830. Before fixing the cylinder body 210 to the partition 130 of the vehicle, the operator mounts the cylinder body 210 to the partition 130 using the mounting part 240 or 500 for smooth operation. In this case, a hook member 241 of the mounting part 240 according to an embodiment, particularly the engaging portion 410, may be fastened to the partition 130, thereby causing the cylinder body 210 to be mounted to the partition 130. A stopping portion 510 of the mounting part 500 according to another embodiment may be caught by the partition 130, thereby causing the cylinder body 210 to be mounted to the partition 130. In a case where the mounting part 500 including a plurality of stopping portions 510 is used, the operator may be able to adjust an angle at which the cylinder body 210 is mounted to the partition 130, when necessary.

The operator fixes the cylinder body to the partition of the vehicle in operation S840. The operator fixes the cylinder body 210, which is mounted to the partition 130 by the mounting part 240 or 500, to the partition 130. The operator may fix the cylinder body 210 to the partition 130 in a screw fastening manner. Since the cylinder body 210 is mounted to the partition 130 by the mounting part 240 or 500, the operator may be able to easily mount the cylinder body 210 to the partition 130 in the engine room 110 or the cabin room 120.

According to the present disclosure, as the cylinder body 210 is mounted to the fixing part 230 of the partition 130 of the vehicle, a stud bolt conventionally used to mount the cylinder body 210 to the partition 130 of the vehicle has a short length, by which the difficulty of securing space in the small engine room 110 can be addressed. This brings a more significant effect, considering that an engine room of a next-generation eco-friendly vehicle tends to be very small and securing space in the engine room is emerging as an important issue. In addition, the operator may more efficiently and safely work on a vehicle assembly line.

According to one embodiment, a brake apparatus includes a mounting part to mount a cylinder body to a fixing part such as a partition of a vehicle, thereby providing a spatial advantage in a small engine room.

According to an exemplary embodiment, a brake apparatus includes a mounting part to mount a cylinder body to a fixing part such as a partition of a vehicle, thereby enabling an operator to efficiently work on an assembly line.

Although the respective operations in the flow chart of the present disclosure have been described as being sequentially performed, this is only an exemplary description of the technical idea of at least one embodiment of the present disclosure. In other words, those skilled in the art will appreciate that various modifications, additions and substitutions are possible, without departing from the characteristics of at least one embodiment of the present disclosure. For example, the order of the operations in the flow chart is able to be changed, or one or more of the operations are able to be performed in parallel. Therefore, the present disclosure is not limited to the time-series order as shown in the flow chart.

Various implementation of systems and techniques described in the present specification may be realized in digital electronic circuitry, integrated circuitry, field programmable gate array (FPGA), application specific integrated circuit (ASIC), computer hardware, firmware, software, and/or a combination thereof. These various implementations can include implementation in one or more computer programs that are executable on a programmable system. The programmable system includes at least one programmable processor (which may be special or general purpose) coupled to receive data and instructions from, and to transmit data and instructions to, a storage system, at least one input device, and at least one output device. These computer programs (also known as programs, software, software applications or code) include instructions for a programmable processor and are stored in a "computer-readable recording medium."

The computer-readable recording medium includes any type of recording devices in which data readable by a computer system is stored. The computer-readable recording medium may be a non-volatile or non-transitory medium, such as a Read Only Memory (ROM), a Compact Disc Read Only Memory (CD-ROM), a magnetic tape, a floppy disk, a memory card, a hard disk, a magneto-optical disk, a storage device, etc. and may further include a transitory medium such as a data transmission medium. In addition, the computer-readable recording medium may be provided in a distributed processing system where computer systems are networked to store and execute the computer-readable codes at distributed locations.

Various implementations of the systems and techniques described herein may be implemented by a programmable computer. Here, a computer includes a programmable processor, a data storage system (including a volatile memory, a non-volatile memory, a different-type storage system, or a combination thereof) and at least one communication interface. For example, the programmable computer may be one of a server, network equipment, a set-top box, an embedded device, a computer expansion module, a personal computer, a laptop, a Personal Data Assistant (PDA), a cloud computing system, or a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A brake apparatus comprising:
a cylinder body;
a fixing part configured to be coupled to the cylinder body and comprising an insertion hole through which the cylinder body is extended when securing the cylinder body to the fixing part and a screw fastening hole configured to receive a fastener to secure the cylinder body to the fixing part; and
a mounting part installed on the cylinder body, the mounting part including:
a ring member in which the cylinder body is inserted, and a hook member extending from the ring member and including an engaging portion positioned to engage the fixing part around the insertion hole to hold the cylinder body in place with respect to the fixing part when the cylinder body is extended through the insertion hole while the cylinder body is being secured to the fixing part, wherein the hook member comprises:
a first support portion positioned at a side of the engaging portion; and
a second support portion connected to the first support portion.

2. A brake apparatus comprising:
a cylinder body;
a bracket formed at a side of the cylinder body;
a fixing part configured to be coupled to the bracket and comprising an insertion hole through which the cylinder body is extended when securing the bracket to the fixing part and a fastening hole configured to receive a fastener to secure the bracket to the fixing part; and
a mounting part attached to the cylinder body or the bracket and configured to extend through the insertion hole of the fixing part when securing the bracket to the fixing part, the mounting part including at least one stopping portion positioned to engage the fixing part around the insertion hole to hold the cylinder body and the bracket in place with respect to the fixing part when securing the bracket to the fixing part.

3. The brake apparatus of claim 2, wherein the at least one stopping portion comprises a plurality of stopping portions.

4. The brake apparatus of claim 3, wherein:
the plurality of stopping portions is positioned along a longitudinal direction of the cylinder body, and each of the stopping portions is configured to engage the fixing part to hold the cylinder body and the bracket at a different angle with respect to the fixing part.

5. The brake apparatus of claim 2, wherein the mounting part comprises a heat resistant material.

6. The brake apparatus of claim 2, wherein the mounting part comprises a sound-absorbing material.

7. The brake apparatus of claim 2, wherein the mounting part comprises a mechanical stress-absorbing material.

8. The brake apparatus of claim 2, wherein the mounting part comprises an elastic material.

9. A method of installing a brake apparatus at a partition in an engine room of a vehicle, the partition having an insertion hole, the method comprising:
inserting a cylinder body into the insertion hole of the partition, the cylinder body including a bracket configured to be secured to the partition;
positioning a portion of a mounting part on the cylinder body in engagement with the partition to hold the cylinder body in position with respect to the partition; and
securing the bracket to the partition using at least one fastener while the mounting part holds the cylinder body in position with respect to the partition, wherein:
the mounting part is attached to the cylinder body or the bracket and extends through the insertion hole along with the cylinder body, and the mounting part includes at least one stopping portion positioned to engage the partition around the insertion hole to hold the cylinder body and the bracket in place with respect to the fixing partion partition when securing the bracket to the partition.

10. The installation method of claim 9, further comprising:
adjusting, using the at least one stopping portion, an angle at which the cylinder body is mounted to the partition.

11. The installation method of claim 9, wherein fixing the cylinder body to the partition comprises screw-fastening the cylinder body to the partition.

\* \* \* \* \*